United States Patent [19]

Kaufmann et al.

[11] Patent Number: 4,536,383

[45] Date of Patent: Aug. 20, 1985

[54] METHOD FOR PREPARATION OF ALKALI METAL SELENATES

[75] Inventors: Lothar Kaufmann, Hennef; Klaus-Dieter Hellwig, Bad Honnef, both of Fed. Rep. of Germany

[73] Assignee: Degussa Aktiengesellschaft, Frankfurt, Fed. Rep. of Germany

[21] Appl. No.: 657,326

[22] Filed: Oct. 3, 1984

[30] Foreign Application Priority Data

Oct. 27, 1983 [DE] Fed. Rep. of Germany ....... 3338893

[51] Int. Cl.$^3$ .............................................. C01B 19/00
[52] U.S. Cl. .................................... 423/508; 423/592
[58] Field of Search ............................... 423/508, 592

[56] References Cited

PUBLICATIONS

Gmelins Handbuch der Anorganischen Chemie, Bd. Selen B, (1949), p. 79.
B Malinak, Collection Czechoslov. Chem. Commun., vol. 21, 1956, p. 1073.

*Primary Examiner*—Gary P. Straub
*Assistant Examiner*—Jackson Leeds
*Attorney, Agent, or Firm*—Beveridge, DeGrandi & Weilacher

[57] ABSTRACT

A method for the preparation of alkali metal selenates through oxidation of powdered selenium with hydrogen peroxide and neutralization of the formed selenic acid with alkali metal hydroxide or alkali metal carbonate, wherein the selenium oxide in the first step is brought to reaction at the surface of a warmed portion of hydrogen peroxide and subsequently in a second step the resulting acid solution is partially neutralized and the remaining selenite is further converted with hydrogen peroxide to the selenate.

11 Claims, No Drawings

METHOD FOR PREPARATION OF ALKALI METAL SELENATES

The present invention relates to a process for the preparation of alkali metal selenates through oxidation of powdery metallic selenium with hydrogen peroxide, neutralization of the resulting acid with alkali metal hydroxide or alkali metal carbonate and, further, isolation of the products by evaporation to dryness. The advantage of the new method of this invention resides in considerable simplification of operation and in a higher product purity as compared to the known methods.

Selenium is a very important trace element for the feeding of livestock. The absence of selenium from the diet of livestock will lead, inter alia, to the disruption of muscle functions. Livestock animals such as sheep which are exclusively maintained on pasture land, usually take up the necessary amount of the element from the forage plants. In soils that are poor in selenium, it is accordingly necessary to add selenium artificially to the pasture; this takes place in the form of the readily plant adsorbable alkali metal selenates. The selenate is in this case added as a component of a mixture of ingredients in conventionally marketed fertilizer compositions. In order to provide the requirement of alkali metal selenates, the only available methods known at present are those that are either too complicated and therefore high in cost, or methods leading to a low content product.

The object of the present invention therefore resides in providing a process, which is as simple as possible, for the preparation of alkali metal selenates of high purity.

In accordance with the state of the art, a series of processes are available which start with the alkali metal selenites or selenious acid. In such methods, the determinative method step resides in the oxidation of the selenite ion to selenate ions. In this regard, the following alternatives are known:

1. Alkali metal selenites are heated in a stream of oxygen up to about 700° C. This reaction leads only, however, to a product having 90% by weight selenate. The addition of alkali metal nitrate improves the conversion slightly; however, at the same time, it depresses the $Na_2SeO_4$ content of the end product. Moreover, the technical feasibility of using this oven process for high quantities is made more difficult because of the flow through of several different melting points of the reaction mixture; (see Gmelins, Handbuch der Anorganischen Chemie, Bd. Selen B. (1949), page 79).

2. Starting with a solution of selenious acid, one adds hydrogen peroxide thereto, warms up the mixture and then boils the mixture while passing oxygen through for 12 hours, using a reflux condensor. Although with this protracted method, more than 325% of the stoichiometric amount of the hydrogen peroxide is utilized, at the conclusion of the process, there is found in the solution a maximum of only 97 weight percent selenic acid together with 3 weight percent, or more, of unconverted selenious acid. Furthermore, it is to be observed that with this process, an additional method step is necessary for the preparation of selenious acid, that is to say, selenium dioxide, and resides in first bringing about the oxidation with hydrogen perioxide solution to the selenate (G. Brauer, Handbuch der Präparativen Anorganischen Chemie, 3. Aufl. (1975), page 425).

3. A solution of an alkali metal selenite is oxidized with calcium permanganate or chloric acid. In this process, the separation of the introduced foreign ions is very protracted. The selenate must therefore next be precipitated with a solution of a barium salt and subsequently, the resulting alkali metal selenate must be converted with a sulfuric acid to selenic acid and barium sulfate, which must then be separated. The results achieved with this method, relative to the introduced selenite, are under 70 weight percent (Gmelins Handbuch der Anorganischen Chemie, Bd. Selen B (1949), page 74 et seq.).

4. Starting with an alkali metal selenite solution, an electrolysis process is then carried out. At the anode, selenite is quantitatively oxidized to selenate. The disadvantage of this method is the very high technical and financial requirements which must be undertaken in support of the business and above all for the construction of the electrolysis cells which is necessary, in that the anode and cathode cells must be separated by a membrane which is impervious to the ions. See U.S. Pat. No 2,583,799.

5. Metallic selenium is oxidized in powdered form with 20 to 80 weight percent hydrogen perioxide and thereafter, the mixture of the two reactants is permitted to stand with cooling for 20 to 24 hours. Then, it is warmed on a water bath and during the next 8 to 12 hours additional hydrogen perioxide is added. The disadvantage of this method is the lengthy processing time, the extraordinarily large amount of oxidation material needed (21–27 mol hydrogen peroxide per mol of selenium) and the proportionately reduced results of, on the average, 94 weight percent $H_2SeO_4$ (B. Malinak, Collection Czechoslov. Chem. Commun., Vol. 21, 1956, page 1073).

The selenic acid solutions obtained by the oxidation methods described in paragraphs 2 and 5 above can generally be neutralized with alkali metal hydroxides and the resulting alkali metal selenate can be obtained by evaporation of the water.

The method of the invention has as its goal the elimination to the extent possible of the disadvantages of the previously known methods, and in one aspect, to simplify the procedural methods and in the other apsect, the obtaining of an alkali metal selenate with a content of over 99.5 weight percent $Na_2SeO_4$.

This goal is successfully obtained according to the present invention through the control of the known conversion of powdery metallic selenium with hydrogen peroxide according to the reaction sequence:

$$Se + 3H_2O_2 \rightleftharpoons H_2SeO_4 + 2H_2O$$

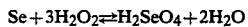

and a subsequent neutralization, for example, according to the equation:

$$H_2SeO_4 + 2NaOH \rightarrow Na_2SeO_4 + 2H_2O$$

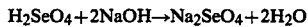

The reaction is carried out by employing 4 to 6 mol $H_2O_2$ per mole of selenium in the form of a 30 to 50 weight percent hydrogen peroxide solution which is warmed to a temperature of 30 to 100° C. The selenium powder is charged at a velocity of dosing corresponding to the rate of dissolution of the corresponding selenium particles with warming of the reaction medium up to the boiling temperature as well as a maintaining of this temperature so that the dissolution of the selenium powder is thereby accomplished on the quiet surface of the reaction medium. After the termination of the charging of the selenium and complete solution of the last selenium particles, the reaction mixture is permitted to undergo an after reaction until the evolution of the gas is ended. Then with stirring, the alkali metal hydroxide or alkali metal carbonate is added at a temperature of 80° to 100° C. until a pH of 0.5 to 5, preferably of 3, is obtained. The reaction medium is then adjusted to a temperature of 30° to 100° C. and is converted with 0.5 to 1 mol hydrogen peroxide per mol selenium in the form of a 30 to 50 weight percent hydrogen peroxide solution with the temperature rising to 90° to 100° C. until the cessation of the gas evolution. This is followed by the neutralization of the selenic acid at a pH of 7 and subsequently the isolation of the salt.

The selenium powder can be used in a commercially available form with a particle size of less than 63 microns ($\mu$m). Advantageously, the form for addition is an aqueous suspension wherein 0.5 to 5, preferably 2, parts by weight of selenium per 1 part by weight of water are present. In accordance with the preferred methods, the suspension is charged with an eccentric helicoidal pump. In order that the method of the invention achieve a maximum material throughput with constant volume of the surface of the reaction medium, it is best to use a reaction vessel which has a ratio of diameter to height equal to or greater than 1 to 1.

It has now been determined as being very practicable that the selenium; that is, the aqueous suspension, be introduced in the middle or center of the fluid surface of the reaction medium. The selenium particles float outwardly from the point of introduction and should by this mechanism be dissolved in the hydrogen peroxide before reaching the wall of the vessel. It has now been surprisingly found that lower results are obtained when the selenium particles reach the vessel walls and agglomerate at that point, or when the particles are distributed in the hydrogen peroxide with stirring. It is to be noted that in this case, a portion of the hydrogen peroxide is lost through decomposition as a result of which also a considerable gas evolution and foam formation is observed.

In the method of the invention, it is most efficient and economical to use a median hydrogen peroxide concentration. It has been determined for the obtaining of a rapid conversion and for the reduction of hydrogen peroxide losses that a particularly efficient concentration for the hydrogen peroxide solution in both oxidation steps is 35 weight percent.

The two oxidation steps using hydrogen peroxide in each step as described above are preferably carried out at a starting temperature of 50° to 70° C., preferably to 60° C. In the aforementioned initiation of the charging rate for the selenium in the first oxidation step, because of the warming up of the reaction, the aforementioned temperature of the reaction medium rapidly increases to the boiling point (105° C. when 35 weight percent $H_2O_2$ is used); the boiling temperature during the duration of the introduction of the selenium is maintained. During the after reaction period, the reaction mixture cools itself somewhat, for example, down to 60° C. At this temperature, the initial neutralization may be begun and the temperature is then maintained in the range of 80° to 100° C., with 95° C. being preferred.

Subsequently, the desired reaction temperature for the second oxidation step is initiated and the total amount of the aforementioned oxidation material for the second oxidation step is added all at once. The temperature increase which results therefrom is held to 95° to 100° C. in order to avoid an excess of foaming. In this step, a minimum temperature of 90° C. is necessary.

The conclusion of the after reaction following the first oxidation step and the conclusion of the second oxidation step can in any event be determined by the fact that the oxygen evolution which accompanies the conversion reaches a cessation in the reaction medium.

In the initial and final neutralization steps, there can be used with advantage 50 weight percent caustic soda solution or a saturated aqueous soda solution.

The present invention resides in a new method for the preparation of alkali metal selenates by oxidation of metallic selenium with hydrogen peroxide in aqueous phase and obtaining of the desired product from an alkali metal hydroxide neutralized solution by evaporation of the water wherein the selenium, for example, in the form of an aqueous suspension thereof, is brought to reaction on the surface of the previously warmed amount of hydrogen peroxide for a first oxidation step, and after a partial neutralization of the acidic solution which is obtained in the first phase, a second oxidation step follows in the same fashion, by adding the hydrogen peroxide to the remaining amount of the selenite for oxidation.

The significant advantage of the method of the present invention is based on the discovery that the oxidation reaction is carried through advantageously from the beginning at greater temperature and that the completion of the oxidation of the selenite to selenate with hydrogen peroxide is rapidly carried out at a pH of 0.5 to 5, preferably 3, whether at lower, also with higher pH values this measure is possible. In accordance therewith, a rapid and complete conversion of the elemental selenium in the sixth valency state is possible. It is fundamental for the operation of the new method that the selenium powder has the possibility of spreading out on the quiet surface of the aforementioned hydrogen peroxide solution and to float towards the rim of the vessel to react.

With the foregoing description of the edge condition characteristics of the present invention, the specific amount of the oxidation material needed for reaction is markedly reduced as compared to the closest known prior art method according to procedure 5 noted above. It is merely sufficient to use a hydrogen peroxide concentration per mol of selenium of only in the range of 5 to 7 mol $H_2O_2$. With the procedure as described in the literature citation 5, it is necessary to use more than 20 mol $H_2O_2$ per mol selenium.

The invention is further illustrated in the following representative examples.

EXAMPLE 1

In a enameled steel container (height 500 mm, diameter 1500 mm) fitted with stirring means, which through a double jacket can be heated as well as cooled, there is charged in 340 kg of a 50 weight percent hydrogen peroxide solution and this is warmed to 30° C. 98.7 kg of pulverized selenium (particle size of less than 65 microns) are suspended in 200 liters of water, and this suspension is introduced, by means of an eccentric helicoidal pump, into the center of the above mentioned hydrogen peroxide liquid (with stationary stirring means). The rate of charging is controlled so that the reaction solution has added to it 1 kg of selenium per minute. The temperature rises up to 105° C. at the beginning of the reaction of the hydrogen peroxide with the selenium and is maintained at this point until the end of the charging of the selenium. The selenium particles move themselves from the point of entry in the direction of the vessel wall and completely dissolve themselves in this way. The solution at the conclusion of the introduction of the selenium is permitted to undergo an after-reaction for 60 minutes and is then cooled down to 60° C. Through the addition of 246 kg of 40 weight percent of potassium hydroxide solution, optionally with stirring, a partial neutralization of the solution is accomplished to a pH of 0.5.

With the neutralization, the temperature of the solution is then raised to 80° C. After that, it is cooled to 60° C. Then, after cessation of stirring, 84.5 kg of 50 weight percent hydrogen peroxide solution is permitted to flow in, and as a result of that the temperature of the solution is reduced to 45° C. The system is then heated with stirring to 50° C. and the stirrer is then set at rest. The temperature of the reaction solution then climbs up to 90° C. and is held there because of the second oxidation stage now takes place which requires 45 minutes, the termination of which is noted by the ending of the evolution of gas. An after-reaction is permitted to take place for a time of 60 minutes; the system is cooled with stirring to 60° C. and through the addition of 106 kg of 40 weight percent potassium hydroxide, a pH of 7.0 is obtained. The solution is then conveyed to a spray drying apparatus. The result is 231 kg of potassium selenate with a content of 99.7 $K_2SeO_4$.

EXAMPLE 2

This example is carried out as described in Example 1, however with the following changes:

243 kg of a 35 weight percent aqueous hydrogen peroxide solution is provided and is heated to 60° C. 39.5 kg selenium powder are suspended in 8 liters of water. With a charging rate of selenium of 1 kg per minute, the total time for introduction is 40 minutes. The partial neutralization is carried out with 75 kg of a 50 weight percent caustic lye as a result of which a pH of 3 is obtained. The temperature of the partial neutralization is controlled at 90° C. In the second oxidation step which is begun at a temperature of 60° C., 48.6 kg of a 35 weight percent hydrogen peroxide is used and the maximum temperature of the reaction solution is limited at 95° C. The reaction time requires 40 minutes. In the second neutralization step, 5.6 kg of a 50 weight percent caustic lye are used.

As a result of this preparation, the product obtained thereby has a content of 99.7% $Na_2SeO_4$.

EXAMPLE 3

The process as carried out as described in Example 1, however with the following changes:

340 kg of a 30 weight percent hydrogen peroxide solution are heated to 70° C. 39.5 kg selenium in powdered form are introduced in the center of the surface of the reaction vessel containing the hydrogen peroxide. With a charging rate of the selenium of 1 kg per minute, the total introduction time is 40 minutes. The partial neutralization is carried out with 58 kg of a solid lithium hydroxide ($LiOH.H_2O$), as a result of which a pH of 5.0 is achieved. The temperature with the partial neutralization is controlled to 100° C. In the second oxidation step which is commenced at 70° C., 57 kg of a 30 weight percent hydrogen peroxide is used and the temperature of the reaction solution is brought to 100° C. The duration of the reaction is 40 minutes. In the second neutralization step, 1.3 kg of solid lithium hydroxide is used.

The product obtained as a result of this process contains 99.6% $Li_2SeO_4$.

Further modifications and variations of the invention will become apparent to those skilled in the art from the foregoing and are intended to be encompassed by the claims appended hereto.

We claim:

1. The method for the preparation of alkali metal selenates comprising
   providing 4 to 6 mols hydrogen peroxide per mol of selenium in the form of a 30 to 50 weight percent hydrogen peroxide solution as a reaction medium, heating said hydrogen peroxide to a temperature of 30° to 100° C., adding the selenium in a powdered form at such a dosing rate such that the selenim powder floats outwardly from the point of introduction on the quiet surface of said reaction medium in a reaction zone having a peripheral wall, dissolving the selenium powder in this area of the surface of the reaction medium before reaching said peripheral wall the complete dissolution of the last selenium particles, permitting the reaction medium to undergo further reaction until evolution of gas ceases
   then after stirring adding alkali metal hydroxide or carbonate in an initial neutralization step added at a temperature of 80° to 100° C. until a pH of 0.5 to 5 is obtained,
   elevating the temperature of the reaction medium to 30° to 100° C. with the addition of 0.5 to 1 mol hydrogen peroxide per mol of selenium in the form of a 30 to 50 weight percent hydrogen peroxide solution,
   maintaining the temperature at 90° to 100° C. until cessation of gas evolution and
   neutralizating the selenic acid,
   and isolating the salt obtained thereby.

2. The method as set forth in claim 1, wherein a pH of 3 is obtained as a result of the addition of the alkali metal hydroxide or carbonate.

3. The method as set forth in claim 1, further comprising wherein the selenium powder is used as a suspension in water whereby 0.5 to 5 parts by weight of selenium per 1 part by weight of water is utilized.

4. The method of claim 3, further comprising wherein 2 parts by weight of selenium per 1 part by weight of water is used in making the selenium suspension.

5. The method according to claim 1, further comprising wherein the selenium is introduced in the center of the fluid surface of the reaction medium.

6. The method according to claim 1, further comprising wherein the concentration of the hydrogen peroxide solution in both oxidation steps is 35 weight percent.

7. The method according to claim 1, further comprising wherein both oxidation steps take place at a temperature of 50° to 70° C.

8. The method acording to claim 1, wherein both oxidation steps take place at a temperature of about 60° C.

9. The method according to claim 1, further comprising wherein the initial neutralization step is carried out at a temperature of a maximum of 95° C.

10. The method of claim 1, wherein the neutralization steps employ 50% by weight caustic lye or a saturated aqueous caustic soda solution.

11. The method of claim 1, wherein the salt is a salt of sodium, potassium or lithium.

* * * * *